United States Patent
Watanabe et al.

[11] 3,784,285
[45] Jan. 8, 1974

[54] ZOOM LENS

[75] Inventors: Rinzo Watanabe; Masatoshi Shimojima, both of Tokyo, Japan

[73] Assignee: Ponder & Best, Inc., Los Angeles, Calif.

[22] Filed: June 1, 1972

[21] Appl. No.: 258,816

[52] U.S. Cl. .................. 350/187, 350/184, 350/186
[51] Int. Cl. .................. G02b 7/10, G02b 15/18
[58] Field of Search .................. 350/184, 186, 187

[56] References Cited
UNITED STATES PATENTS

| 3,731,987 | 5/1973 | Iida et al. | 350/187 |
| 3,613,544 | 10/1971 | Plihal et al. | 350/187 X |
| 3,655,271 | 4/1972 | Suzuki | 350/187 |

*Primary Examiner*—John K. Corbin
*Attorney*—Delio & Montgomery

[57] ABSTRACT

This disclosure relates to variable focal lens for a still camera having from front to rear a focusing group, a zooming group, a compensating group, and a fixed objective. In a zooming mode of operation, means are provided for moving the second and third groups in a first predetermined relation to vary the effective focal length of the lens system, while in a close focusing mode of operation means are provided for moving the second and third groups in a second predetermined relation for close-up focusing.

16 Claims, 10 Drawing Figures

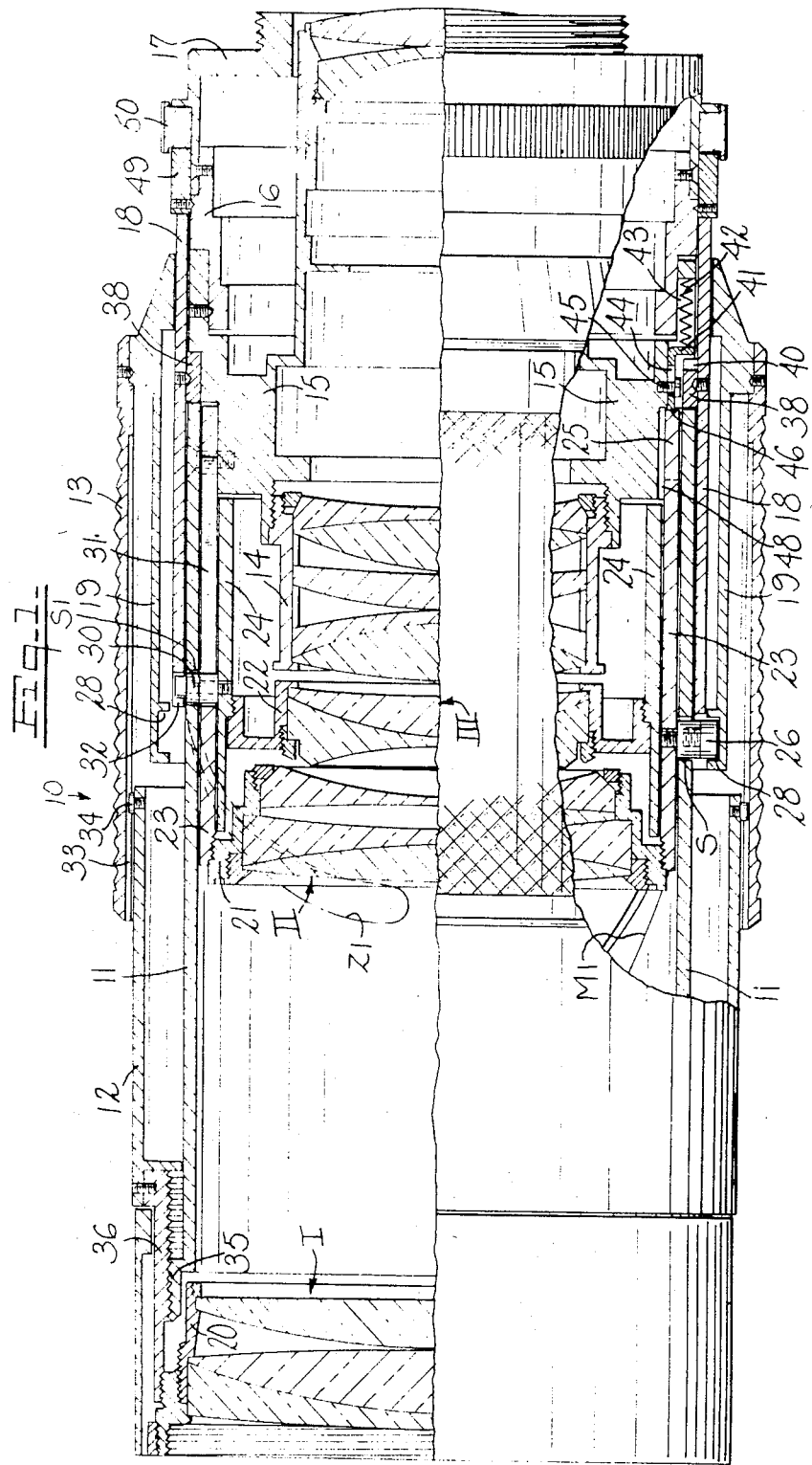

ZOOM LENS

This invention relates to lenses and more particularly relates to zoom lenses having an additional capability of close-up focusing.

Zooming lenses of the type using four lens groups for focusing, zooming, image plane position compensation, and a fixed objective are quite widely known.

The present invention is of such general construction and further includes structure to permit the zooming and compensating lens groups to be utilized for focusing an object as close as eight centimeters from the front lens surface.

The invention provides a simplified new and improved mechanism for moving the zooming lens groups of a varifocal length lens to operate in either a zooming mode or in a close-up or macro mode for very close focusing. The invention further provides an optical system which permits these two modes of operation for a still camera, while providing an image quality comparable to a lens of fixed focal length.

Briefly stated, the invention in one form thereof comprises a lens having a zoom tube receiving a zooming lens group, and a zoom compensation lens group between a front focusing group and a rear fixed objective. The intermediate lens groups are movable in first guide means in a first predetermined relation between the front and rear groups to vary the effective focal length of the lens system in a zooming mode of operation. Second means are further provided to move the zooming groups in a second predetermined relation for close-up focusing while in a macro mode of operation.

An object of this invention is to provide a new and improved zoom lens for a still camera.

Another object of this invention is to provide a zoom lens for a still camera in which the movement of the zooming elements may be guided to provide close-up focusing of objects.

A further object of this invention is to provide a zoom lens of simplified construction having new and improved mechanism which permits the zooming elements to be moved in distinct relationships for either varying the focal length or close-up focusing.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a side longitudinal half section, partly cut away of a lens assembly embodying the invention;

Figure 2A:
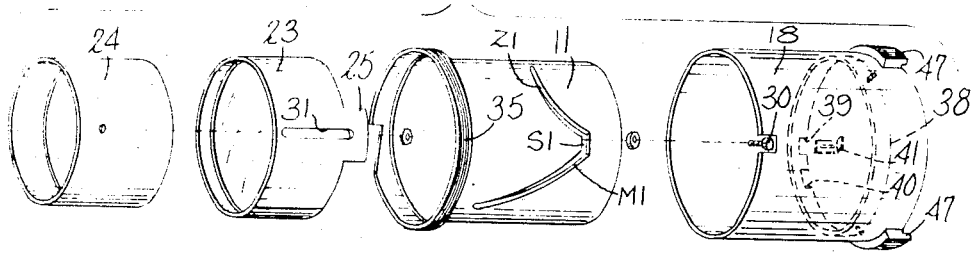
FIGS. 2a and 2b are exploded, isometric views of the movable lens elements of the lens of FIG. 1.

As shown in FIG. 1, an overall lens 10 embodying the invention comprises a zoom tube 11, a focusing member 12, a focus and zoom ring 13 adapted to rotate member 12 and also slide longitudinally with respect thereto, housing member 14, 15 and 16 adapted to mount the fixed objective, hereinafter identified as Group IV, and a camera mount 17 secured to member 16. Tube 11 is fixed to member 14. The mount 17 as shown has a thread-type attachment. However, it may have a bayonet-type attachment dependent upon the camera body to which the lens 10 will be mounted.

The lens 10 further includes a mode selector ring or barrel 18 disposed about tube 11 and member 14, a focus and zoom ring support 19 which is rotatable and slidable with respect to barrel 18, a lens mount 20 for the focusing lens group I, a lens mount 21 for zoom lens group II and a lens mount 22 for the compensating lens group III. Lens mount 21 and lens group II are carried at one end of a zoom tube or ring 23, while lens mount 22 and lens group III are carried in a zoom tube or ring 24 within ring 23. Ring 23 has extensions 25 thereon as will be more clear from exploded views of FIGS. 2a and 2b.

Figure 2B:
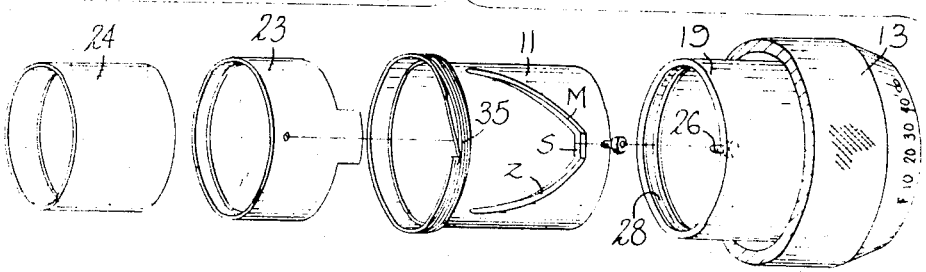

FIG. 2b illustrates essentially the same elements as FIG. 2a but with the parts rotated 180°. FIG. 2a shows the mode ring 18 while FIG. 2b shows the focus and zoom ring 13 with the forwarded portion thereof cut away. The purpose of extensions 25 is to release a detent switch to permit the lens to be used in a zooming mode of operation or a macro mode.

During the zoom mode of operation, lens group II is moved along the length of tube 11 to vary the effective focal length (EFL) of the lens while compensating group III moves at a predetermined rate with respect to the zooming lens primarily to compensate for the image plane shift which occurs during zooming. While lens group III primarily acts as a compensator, it also cooperates with group II to vary the focal length. As will hereinafter be explained during the macro mode of operation, lens groups II and III move in fixed relation to focus an object at a very close distance to the lens.

A guide pin 26 is threadably received in tube 23 and extends therefrom through either a guide slot Z or a cam slot M in tube 11. The end of pin 26 is received within a channel 28 defined in the end of focus and zoom ring support 19.

With this arrangement, it will be seen that as focus and zoom ring 13 is moved linearly along tube 11, the pin in channel 28 will move in one of slots Z or M to impart a predetermined forward and reverse movement determined by the contour of cam slots Z or M, with respect to the linear movement of ring 13. A guide pin 30 extends from ring 24 through a longitudinal slot 31 in ring 23, through either of cam slots Z1 or M1 in tube 11 and into a cutout or recess 32 in mode ring 18. It will be noted that cam slots M and M1 in opposite sides of tube 11 have the same contour, while cam slots Z and Z1 have substantially different contours. As will hereinafter be more fully explained during a zooming mode of operation, the guide pins 26 and 30 move in cam slots Z and Z1, respectively, while the same pins move in cam slots M and M1, respectively, during the macro mode of operation. Otherwise stated, there is a first pair of guides Z and Z1 for lens groups II and III during zooming and a second pair of guides M and M1 for close-up focusing.

In FIG. 1, the lens is shown with the lens groupings in position for a maximum focal length. Focusing is effected by rotating ring 13. Ring 13 receives in a slot 33 therein pins or screwheads 34 extending from focusing member 12. Thus member 12 will rotate with ring 13, and on focusing threads 35 on tube 11 to cause lens mount 20 attached to member 36 to advance or retract with respect to tube 11.

If it is desired to change the focal length from the maximum towards the minimum, ring 13 is moved longitudinally with respect to tube 11 and carries therewith pin 26 in channel 28. Pin 26 moves in cam slot Z in tube 11 and carries therewith tube 23 and lens group II mounted therein. Tube 23 may move longitudinally with respect to tube 24 by virtue of the slot 31 therein through which guide pin 30 extends. The rotary movement of tube 23 produces relative movement of guide pin 30 due to the walls defining slot Z1. Therefore, pin 30 will move in slot Z1 at a predetermined rate and distance relative to tube 23 and tube 24. Lens group III moves at a predetermined longitudinal rate with respect to lens group II.

With this related movement, ring 13 may be operated along tube 11 to vary the EFL of the lens system between the maximum and minimum design EFL's. Curves showing the relative movement of lens groups II and III with respect to lens group IV during the zooming mode of operation are set forth in FIG. 8.

When it is desired to change to the macro mode of operation, ring 13 is moved to the maximum EFL position as shown in FIG. 1. This enables the guide pins 26 and 30 to enter connecting slots S and S1 between the cam slots Z, M and Z1 and M1, respectively, in tube 11. At this time, pin 30 is extending through slot 31 in zoom tube 23, slot S1 and into recess 32 in mode ring 18.

Figure 4:
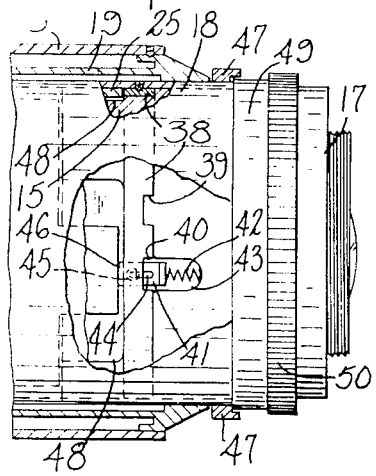
FIG. 4 is a view of the lens of FIG. 1 with a portion thereof cut away to reveal a mechanism for selecting between the modes of operation.
Figure 5:
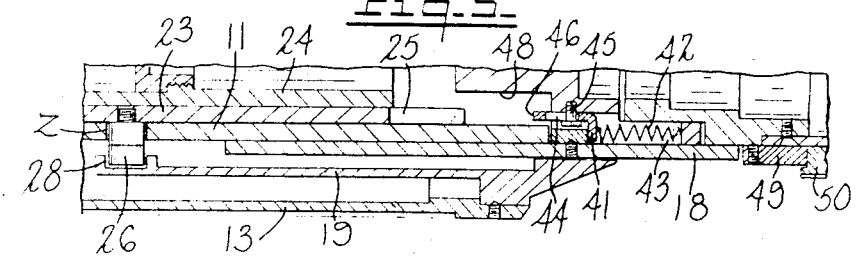
FIG. 5 is a sectional view of the lens as shown in FIG. 4, but rotated about 90°.

Disposed within mode ring 18 at the end of tube 11 is a selector latch ring 38 seen more clearly in FIG. 2a, which has two detent recesses 39 and 40 defined therein and adapted to receive a detent latch member 41. As shown in FIGS. 1, 4 and 5, latch member 41 is acted upon by a spring 42 received in a slot 43 defined by the outer periphery of member 16 and mode ring 18. Member 41 has a slot 44 therein which receives therethrough a threaded guide pin 45 carried in member 15.

Latch member 41 is thus movable under or against the influence of spring 42 a predetermined distance defined by the length of slot 43. As shown in FIGS. 1 and 4, latch 41 is in an unlatched position without detent 40 by virtue of the fact that extension 25 of zoom tube 23 has engaged the leading edge 46 and moved member 41 back against the bias of spring 42. Mode ring 18 may now be rotated to allow latch 41 to enter detent 39 and switch to the macro mode of operation.

Figure 3:
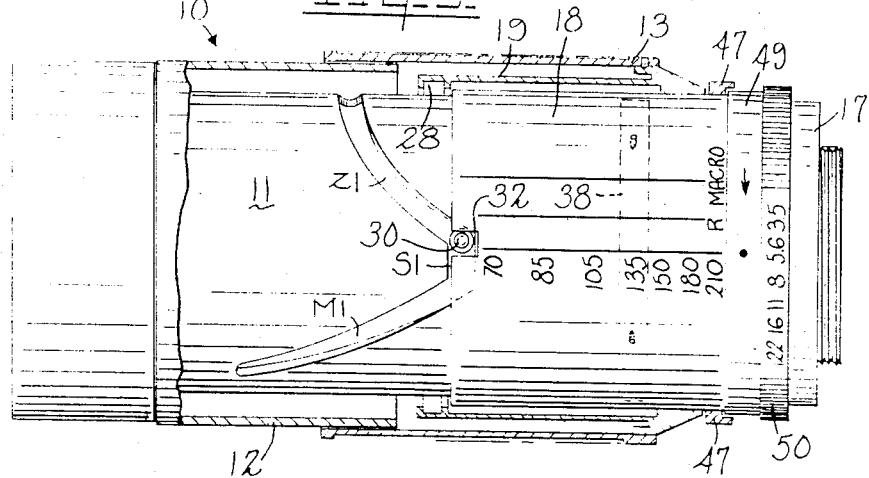
FIG. 3 is a top plan view of the lens of FIG. 1 with the focusing barrel cut away to expose the zoom tube.

As more clearly shown in FIG. 3, when the lens is to be switched to the macro mode of operation, the zoom ring will be fully retracted, pin 30 will be received in recess 32 of mode ring 18. Then mode ring 18 is rotated in the direction of the arrow to move pin 30, and therefore to the other end of slot S1 so that pin 30 may now move in slot M1. At the same time pin 26 will rotate in slot S to a position where it may enter cam slot M.

Slots M and M1 are arranged to provide equal movement of tubes 22 and 23. Ring 13 together with support member 19 and its channel 28 are moved longitudinally along tube 11. The movement of ring 13 causes pins 26 and 30 to follow cam slots M and M1, respectively, and lens groups II and III move for close focusing with a fixed distance therebetween.

In the particular lens system hereinafter described, an object may be photographed in the macro mode at a distance of between about 1.18 meters and 8 centimeters from the front lens.

Figure 6:
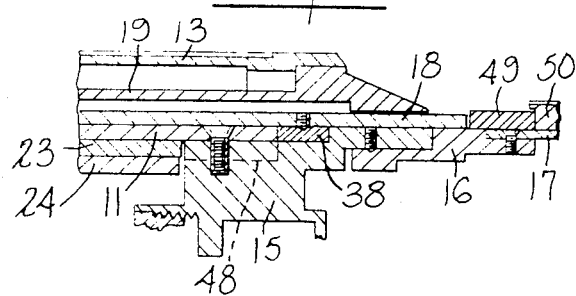
FIG. 6 is a sectional view of a portion of the lens showing a detail of construction thereof.

As more clearly shown in FIG. 4, when the extension 25 strikes detent latch member 41, then mode ring 18 may be rotated and for this purpose, finger grasps 47 may be provided thereon. As more clearly shown in FIGS. 4 and 6, member 15 is recessed as exemplified at 48 to permit the extensions 25 to engage the latch member 41.

To prevent unintended switching of the lens from zoom to macro, or vice versa, when it is at the maximum focal length position, frictional means, not shown, may be provided between the end of mode ring 18 and limit ring member 49 which extends about mounting member 17. Such frictional means may take many forms and would be adapted to allow rotation of mode ring 18 upon a predetermined torque assuming that latch member 41 is withdrawn from the slots 39 or 40.

The ring 50 is the usual aperture setting adjustment which would be disposed behind lens L13. Such construction and the connection to the adjustment therefor are well known in the art and are not set forth here to simplify the disclosure.

Figure 7:
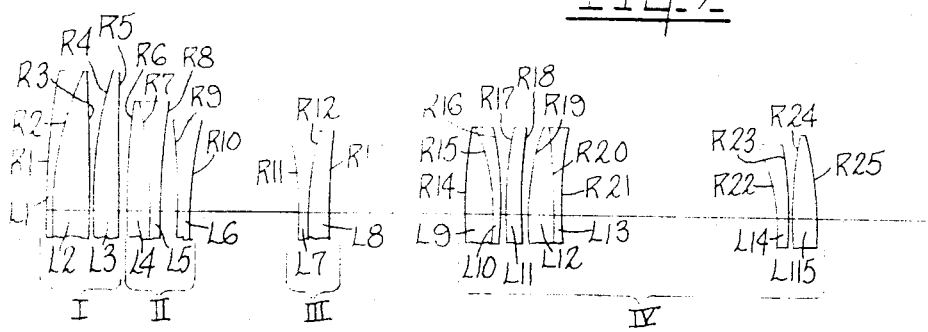
FIG. 7 is a schematic diagram of the lens element.

By way of illustration, the optics of a lens having effective focal lengths of 70–205mm with a relative aperture of 1:3.65 which may be utilized is shown in FIG. 7. The first or focusing group is effective to focus an object from infinity to 1.8 meters and is a three-element construction L1, L2 and L3 with a positive convex-concave and double convex cemented doublet and a single double convex positive lens. Therefore, the first group is positive.

Group II is the zooming lens and is a three-element construction L4, L5 and L6, a double convex, double concave cemented doublet and a double concave negative lens. The second group or zoom lens therefore is of negative power.

Group III comprising lenses L7 and L8 is a two-element cemented construction with a double concave, convex-concave construction, and is of negative power.

Group IV is a telephoto type lens utilizing a seven-element construction L9, L10, L11, L12, L13, L14, and L15 and is a positive lens group.

The overall lens data, with reference to FIG. 7, is set forth in the following table where radii (R) and distances between lens surfaces on the axis of the lens are in millimeters, $N_d$ is the index of refraction and $V_d$ is the Abbe number.

TABLE I

| Lens | Radius in mm | Lens Thickness Or Air Space Distance | $N_d$ | $V_d$ |
|---|---|---|---|---|
| L1 | r1  268.54 | | | |
| | | 1.9 | 1.71736 | 29.5 |
| L2 | r2  80.13 | | | |
| | | 6.9 | 1.58913 | 61.2 |
| | r3  −410.77 | | | |
| | | 0.3 | | |
| L3 | r4  90.60 | | | |
| | | 5.3 | 1.51009 | 63.4 |
| | r5  3376.49 | | | |
| | | 2.041—47.555 | | |

| | | | | | |
|---|---|---|---|---|---|
| L4 | r6 | 222.96 | | | |
| | | | 4.7 | 1.78472 | 25.7 |
| L5 | r7 | −81.30 | | | |
| | | | 1.3 | 1.66672 | 48.4 |
| | r8 | 154.03 | | | |
| | | | 2.7 | | |
| | r9 | −184.02 | | | |
| L6 | | | 1.0 | 1.66672 | 48.4 |
| | r10 | 51.53 | | | |
| | | | 28.624—6.000 | | |
| | r11 | −47.69 | | | |
| L7 | | | 1.0 | 1.52249 | 59.6 |
| | r12 | 33.79 | | | |
| L8 | | | 4.8 | 1.62588 | 35.6 |
| | r13 | 153.92 | | | |
| | | | 24.389—1.500 | | |
| | r14 | 88.43 | | | |
| L9 | | | 6.5 | 1.48749 | 70.0 |
| | r15 | −36.55 | | | |
| L10 | | | 1.46 | 1.80518 | 25.5 |
| | r16 | −56.17 | | | |
| | | | 0.3 | | |
| | r17 | 61.15 | | | |
| L11 | | | 3.87 | 1.48749 | 70.0 |
| | r18 | 284.27 | | | |
| | | | 0.3 | | |
| | r19 | 38.35 | | | |
| L12 | | | 6.0 | 1.48749 | 70.0 |
| | r20 | −104.13 | | | |
| L13 | | | 1.023 | 1.64328 | 47.8 |
| | r21 | 94.78 | | | |
| | | | 49.846 | | |
| | r22 | −20.19 | | | |
| L14 | | | 1.48 | 1.69700 | 48.5 |
| | r23 | −53.33 | | | |
| | | | 0.267 | | |
| | r24 | 135.84 | | | |
| L15 | | | 4.0 | 1.58921 | 41.0 |
| | r25 | −53.64 | | | |

160.000mm

It will be noted that the overall dimension of the lens between surfaces r1 and r25 is substantially less than the maximum effective focal length, 205mm. Therefore a very compact telephoto lens is provided.

The optics herein described are disclosed and claimed in the copending application of Rinzo Watanabe and Ellis Betensky, Ser. No. 258,780 filed on the same day as this application and assigned to the same assignee as the present application.

Figure 8:
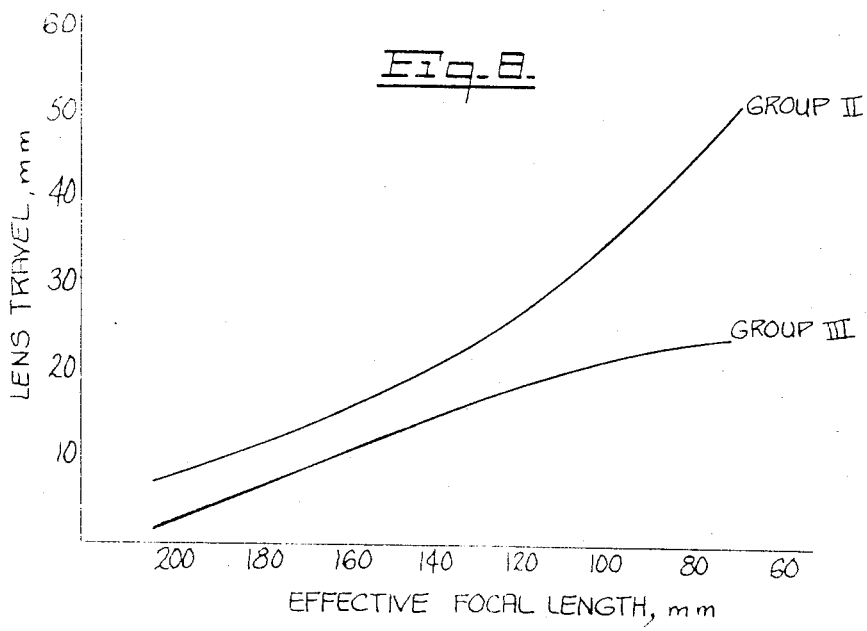
FIG. 8 are curves showing the relative movement of the zooming elements in the zooming mode of operation.
Figure 9:
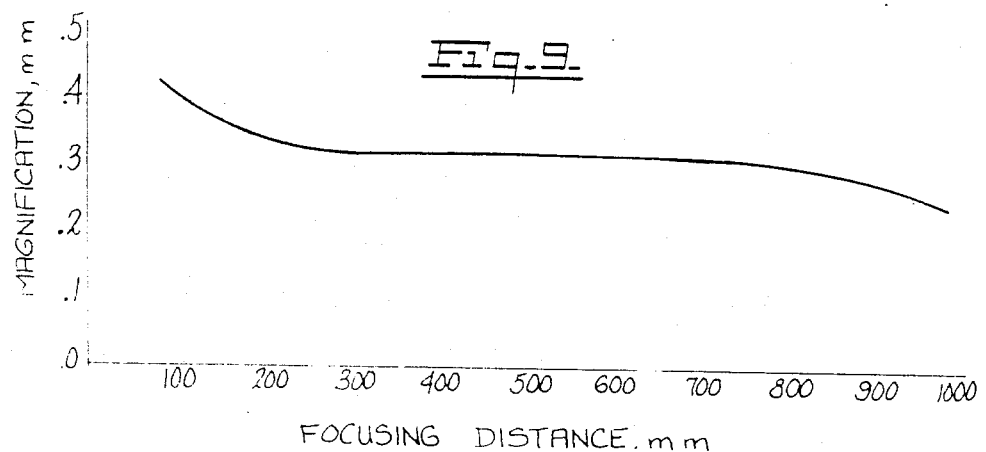
FIG. 9 is a curve showing magnification versus focusing distance for close-up focusing.

The focal lengths of the various lens groups are as follows:

Group I — + 126.000mm
Group II — − 63.900mm
Group III — − 82.888mm
Group IV — + 44.040mm
Groups II and III
with 6.0mm spacing — − 34.620mm The movements of lens groups II and III during the zooming are set forth in FIG. 8. During the macro mode of operation the air space between the adjacent lens surfaces of Groups II and III is held constant at 6.0mm.

This lens when not in the macro mode will focus down to 1.8 meters. To focus below this distance, and to increase magnification, group I is left at a focus distance of 1.8 meters, while groups II and III are simultaneously moved forward with a constant air space therebetween.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens comprising a housing member and having first, second, third and fourth lens groups from an object end to an image end, respectively, in said housing, said first lens being axially movable of said housing for fine focusing, said fourth lens being stationary in said housing, a lens tube included in said housing, said second and third groups being movable axially within said tube, first guide means for moving said second and third groups simultaneously in a first predetermined non-linear relationship of relative movement to vary the effective focal length of said lens, and second guide means for moving said second and third groups simultaneously and equally in a second predetermined relationship of relative movement for close focusing of said lens.

2. The lens of claim 1 wherein said first guide means are first and second slots in said tube having directional components along the length of the tube, said second and third groups are each carried in first and second mounts within said tube, pins extending from said mounts into said first and second slots so that said mounts move in said tube in accordance with the contours of said first and second slots, third and fourth slots in said tube having substantially the same contours with directional components along the length of the tube, a first transfer slot joining said first and third slots at one end thereof, a second transfer slot joining said second and fourth slots at one end thereof so that said pins may be transferred to move in either said first and second slots or in said third and fourth slots.

3. The lens of claim 2 wherein the pin on said second mount extends through a longitudinal slot in said first mount, a selector ring disposed about said tube having a recess therein adapted to receive said pin from said second mount when said second and third groups are positioned for the longest effective focal length of said lens, said selector ring being rotatable with respect to said tube to engage said pin from said second mount and move said pins through said first and second transfer slots to move in either said first and second slots or in said third and fourth slots.

4. The lens of claim 3 further including a room ring movable longitudinally with respect to said tube and coupled to the pin of said first mount for producing movement of said second and third groups.

5. The lens of claim 4 wherein means are provided to couple said zoom ring to said first group so that said first group may be moved for focusing upon rotation of said tube.

6. The lens of claim 1 further including selector means for choosing either said first or second guide means for a mode of operation of said lens.

7. The lens of claim 6 further including means for locking said selector means when said lens is in a selected mode of operation.

8. The lens of claim 7 wherein said selector means is a selector ring disposed at least partially about said tube and rotatable thereon between two predetermined positions to select the mode of operation.

9. The lens of claim 8 further including a mount for said second group, means on said mount for releasing said locking means when said mount is positioned for the maximum effective focal length of said lens.

10. A lens comprising a tube member, first and second lens groups within said tube member, first guide means on said tube for moving said lens groups axially in a first predetermined non-linear relationship to vary the effective focal length of said lens, second guide means for moving said lens groups axially and equally in a second predetermined relative relationship to close focus said lens, transfer means interconnecting said guide means for shifting control of movement of said lens groups between said first and second guide means, and means coupled to said lens groups and movable axially of said tube for moving said lens groups in accordance with either of said guide means.

11. The lens of claim 10 wherein said first guide means is a first pair of guide slots having axial directional components, said second guide means is a second pair of guide slots having axial directional components, said transfer means are first and second transfer slots connecting ends of said first and second guide slots, said lens groups being carried in mounts therefor within said tube, first and second followers extending from said first and second mounts, respectively, into one of a pair of said slots, one of said mounts being disposed within the other of said mounts with the follower thereof extending through an axial slot in the other of said mounts, a member slidable on said tube and engaging the follower of said outer mount, a selector member rotatable with respect to said tube and having a peripheral recess receiving the extending end of the follower of the inner mount when said lens groups are in a position to provide the longest effective focal length, said selector member upon rotation thereof being operative to move said followers in said transfer slots between said pairs of guide slots.

12. The lens of claim 11 further including locking means for normally preventing rotation of said selector member, and means on said outer mount for releasing said locking means when said lens groups are positioned for the longest effective focal length.

13. The lens of claim 12 wherein said selector member has a recess defined therein from an edge thereof, biasing means urging said locking member into said recess, said means on said outer mount being effective to engage said locking member and move it against said biasing means from said recess.

14. The lens of claim 13 wherein said selector member has two recesses therein, and said locking member is adapted to move into either recess to lock said selector for a selected mode of operation of said lens.

15. In a lens system, first and second relatively movable lenses, a tube, first and second lens mounts for said first and second lenses in said tube, a first pair of cam slots defined in said tube, a follower on each of said mounts adapted to extend into one of said first pair of cam slots so that said mounts may be moved in accordance with the contour of said first pair of cam slots to vary the focal length of said lens system, a second pair of cam slots in said tube, a pair of transfer slots interconnecting a cam slot of each pair to permit said followers to be transferred between said first and second pairs of slots, said second pair of cam slots being contoured to predetermine a different relative movement of said mounts from said first slots for close focusing of said lens system, selector means for positioning said mounts for movement under control of either pair of cam slots, and means coupled to said mounts for moving said mounts in a selected pair of slots.

16. The lens system of claim 15 wherein one of said mounts is disposed within the other of said mounts, an axial slot in the other of said mounts, the follower of said one of said mounts extending through said axial slot to one of a selected pair of said cam slots.

* * * * *